(12) United States Patent
Chen et al.

(10) Patent No.: US 6,431,765 B1
(45) Date of Patent: Aug. 13, 2002

(54) DISTRIBUTED NETWORK REPEATER MODULE AND METHOD

(75) Inventors: John K. Chen, Sunnyvale; Gregory Lee DeJager, San Jose; Robert D. Hastings, Fremont; Gordon MacKay; Gopakumar Parameswaran, both of Santa Clara; Santanu Sinha, Cupertino; Robert Gregory Twiss, Portola Valley; Van Van Nguyen, San Jose, all of CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/330,733

(22) Filed: Jun. 11, 1999

(51) Int. Cl.[7] .............................. G02B 6/36; H04B 10/00
(52) U.S. Cl. ............................. 385/92; 385/88; 385/14; 385/24; 385/139; 359/154; 359/164; 359/173
(58) Field of Search ........................ 385/14, 24, 15, 385/16, 88, 89, 92, 139; 359/124, 127, 154, 164, 166, 173

(56) References Cited

U.S. PATENT DOCUMENTS

| | | | |
|---|---|---|---|
| 3,533,045 A | 10/1970 | Henschen | 339/17 |
| 3,652,899 A | 3/1972 | Henschen | 317/101 |
| 3,704,394 A | 11/1972 | Johnson | 317/101 |
| 3,905,665 A | 9/1975 | Lynch et al. | 339/17 |
| 4,832,619 A | 5/1989 | Eck et al. | 439/377 |
| 4,869,680 A | 9/1989 | Yamamoto et al. | 439/327 |
| 5,016,142 A | 5/1991 | White | 361/415 |
| 5,123,859 A | 6/1992 | Davis et al. | 439/405 |
| 5,181,858 A | 1/1993 | Matz et al. | 439/188 |
| 5,222,168 A | 6/1993 | Saito et al. | 385/59 |
| 5,291,368 A | 3/1994 | Conroy-Wass | 361/796 |
| 5,491,418 A | 2/1996 | Alfaro et al. | 324/402 |
| D372,708 S | 8/1996 | Hetherington | D14/114 |
| D382,857 S | 8/1997 | Chen et al. | D13/147 |
| 5,660,567 A | 8/1997 | Nierlich et al. | 439/620 |
| D386,473 S | 11/1997 | England et al. | D13/147 |
| 5,716,221 A | 2/1998 | Kantner | 439/64 |
| 5,757,618 A | 5/1998 | Lee | 361/686 |
| 5,757,998 A | 5/1998 | Thatcher et al. | 385/75 |
| 5,767,999 A | 6/1998 | Kayner | 359/163 |
| 5,801,928 A | 9/1998 | Burstedt et al. | 361/801 |
| 5,809,328 A | 9/1998 | Nogales et al. | 395/825 |
| 5,836,785 A | 11/1998 | Lee | 439/505 |

(List continued on next page.)

Primary Examiner—Brian Healy

(57) ABSTRACT

A repeater, useable for connecting switches in a data communication network, is provided in a distributed and/or modular fashion. The repeater includes a plurality of separate and distinct components or modules connected to or at least partially housed in, the various switches which the repeater modules couple. The distributed and/or modular repeater facilitates accommodating various switching or repeater needs as a network grows or contracts. A light pipe, preferably integral with a module case, conveys indicator lights to a position visible when viewing a switch front panel. A heat spreader unit receives and/or conveys heat and/or protects against undue EMI. A collision-handling state machine transmits modified collision fragments so as to avoid reduction in interpacket gaps, e.g. by downstream repeater modules.

44 Claims, 13 Drawing Sheets

U.S. PATENT DOCUMENTS

| | | |
|---|---|---|
| 5,879,173 A | 3/1999 | Poplawski et al. ........... 438/138 |
| 5,882,211 A | 3/1999 | Choy et al. .................... 439/74 |
| 5,901,263 A | 5/1999 | Gaio et al. ..................... 385/92 |
| D411,827 S | 7/1999 | Gilliland et al. ............ D13/147 |
| 5,993,224 A | 11/1999 | Quillet et al. .................. 439/79 |
| 6,023,544 A * | 2/2000 | Dragone ....................... 385/37 |
| 6,047,172 A | 4/2000 | Babineau et al. ............ 455/300 |
| 6,074,228 A | 6/2000 | Berg et al. ................... 439/180 |
| 6,097,705 A * | 8/2000 | Ben-Michael et al. ...... 370/315 |
| 6,108,198 A | 8/2000 | Lin ............................. 361/683 |
| 6,115,263 A | 9/2000 | Babineau et al. ............ 361/796 |
| 6,163,637 A * | 12/2000 | Zirngibl ........................ 385/37 |
| D436,919 S | 1/2001 | Wakefield et al. ......... D13/110 |
| 6,195,425 B1 * | 2/2001 | Farris ......................... 370/230 |
| 6,243,510 B1 * | 6/2001 | Rauch .......................... 385/15 |
| 6,305,848 B1 * | 10/2001 | Gregory ....................... 385/53 |
| 6,343,083 B1 * | 1/2002 | Mendelson et al. ......... 370/466 |

\* cited by examiner

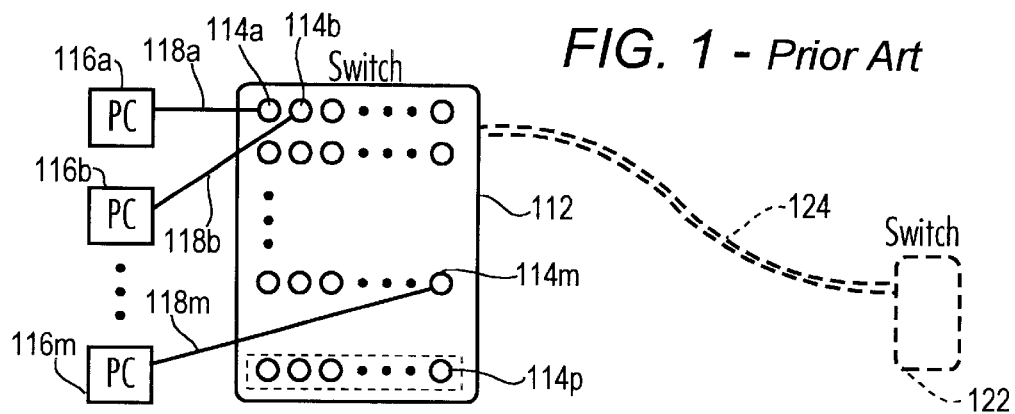
FIG. 1 - Prior Art
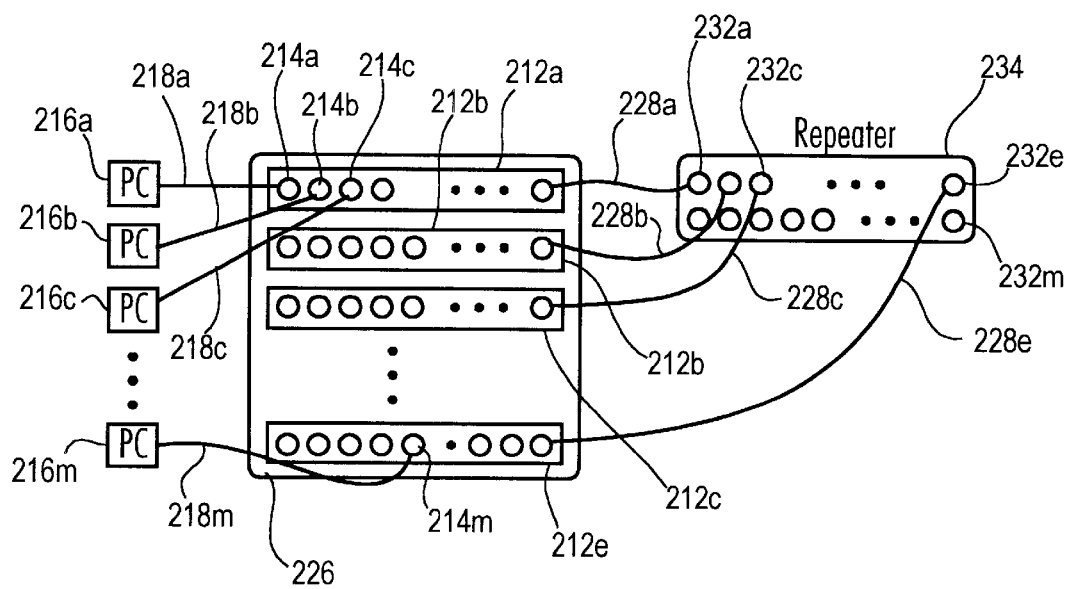
FIG. 2 - Prior Art

DISTRIBUTED NETWORK REPEATER MODULE AND METHOD

Cross-reference is made to U.S. patent application Ser. No. 09/321,066, pending, of Mackay filed May 27, 1999 for "DISTRIBUTED NETWORK REPEATER SYSTEM"; U.S. patent application Ser. No. 09/330,478, pending, of Mackay, Parameswaran, Twiss and Covaro for "CABLE DETECT AND EMI REDUCTION APPARATUS AND METHOD", filed on even date herewith; U.S. patent application Ser. No. 09/330,434, now U.S. Pat. No. 6,272,019, of William Edwards, Frederick Schindler and Robert Twiss for "CLOSELY-POSITIONED MULTIPLE GBIC CONNECTORS", filed on even date herewith, and U.S. patent application Ser. No. 29/106,266, now Design Pat. No. D422,828, of Twiss, Van Nguyen, Wood and Huang for "REPEATER MODULE", filed on even date herewith, all incorporated herein by reference.

The present invention relates to a method and apparatus for a computer network repeater and in particular to a repeater system which provides discrete distributed modules.

BACKGROUND INFORMATION

Repeaters provided in computer or other networks, such as local area networks (LAN), wide area networks (WAN), telecommunications networks and the like, have typically been provided in monolithic or nondistributed fashion such as providing a single chassis or cabinet for a repeater to which the various signal sources/destinations are coupled e.g. via cables and the like. This configuration can be problematic when the space which is available for accommodating network equipment is limited and/or costly because the monolithic or undistributed repeater device will typically occupy a contiguous and relatively large portion of such space. The problem is exacerbated by the fact that repeaters (especially high-bandwidth repeaters such as repeaters configured for a bandwidth of 1 gigabit per second or more) are typically provided in substantially non-modular form, e.g. are available in a relatively few sizes (both in terms of physical size and the number of ports or connections supported). In such situations, it is impossible or infeasible for a user to be able to obtain a repeater of substantially the currently-required size. Typically, the user must employ a repeater which may be substantially larger and/or support more ports or connections, than actually required. Thus, the non-modular nature of typical repeaters means that more resources (both spatial and financial) are consumed, than necessary to achieve the required repeater functionality.

Another difficulty associated with the non-modular nature of previous repeaters is the inability to be readily reconfigured to accommodate changing conditions. For example, there may be network installations in which it would be desirable to facilitate expansion of the network e.g. as the number of users increases or other conditions change and/or to remove or isolate certain network components in other types of conditions. However, monolithic-type repeaters are included in one or a few discrete sizes on an "all or nothing" basis. Thus, in a typical situation, a network may be configured with a repeater which is over-sized for current conditions, in anticipation of later growth, or as a result of user shrinkage.

Although it is desired to reduce the inflexibility in other disadvantageous aspects associated with undistributed and/or non-modular repeaters, it is preferred that such reduction in inflexibility should not entail an undue increase in the burden of installing, configuring or administering a network. Accordingly, it would be useful to provide a distributed and/or modular, preferably high bandwidth, repeater in which some or all features associated with installing, configuring, maintaining or administering the network are performed substantially automatically such as by automatically sensing installation or removal of repeater modules or module connections. In this regard, "automatically" means substantially without the need for manual, human configuration or installation steps (such as setting switches and the like).

For example, preferably repeater modules are readily installed or connected (e.g. by cables) by the end user in a relatively simple "plug in" fashion without the need for additional manipulation, such that the modules and/or associated circuitry sense the insertion, coupling or removal and perform appropriate configuration operations. Accordingly, it would be useful to provide a (preferably high-bandwidth) network repeater which is substantially distributed and/or modular in nature.

Yet another disadvantageous aspect of nondistributed or non-modular repeaters is that malfunctioning or failed units cannot be readily isolated and/or replaced. Accordingly, it would be useful to provide a network repeater having a plurality of modules such that a failed or malfunctioning module can be readily detected, isolated, removed and/or replaced.

Network devices, including repeaters or components thereof, may operate in various states such as normal operating mode, standby mode, and the like. In some cases, such devices or components may be in an "error" or non-operating state. For most efficient implementation, it would be desirable to provide indicators such as light indicators or other indicators which can provide information regarding the state of a device or component, preferably readily perceivable when the device or component is in its normal operating position, and preferably in a relatively cost-efficient fashion.

Many components of a repeater generate significant amounts of heat which, if not properly distributed and dissipated, can lead to malfunction and/or damage. Certain repeater devices and/or components thereof, can generate electromagnetic signals which, if permitted to propagate, e.g. beyond the perimeter of the device, can lead to undesirable or impermissible levels of electromagnetic interference (EMI). Accordingly, it would be useful to provide repeater devices or components in which generation of heat and/or electromagnetic signals is properly handled, controlled or restricted. It would be particularly advantageous to handle generation of heat and/or electromagnetic signals in a cost efficient manner, such as by including one or more devices of components which are useful for handling both heat and electromagnetic signals.

A number of communication systems provide some or all data in packetized form. In the time domain, data packets are typically separated from one another by a time period referred to as the inter-packet gap (IPG). In at least some systems, some or all of the IPG is used for (at least some) processing overhead and other purposes, e.g. to accommodate variability between nodes and the network. Thus, there is a potential for loss of data or other problems if the IPG becomes too short. Accordingly, it would be desirable to provide a network repeater which can substantially avoid or reduce the probability of IPGs which are too short.

SUMMARY OF THE INVENTION

At least aspects of the present invention include a recognition of problems in previous approaches, including problems as described herein. According to an aspect of the invention, a repeater is provided which is distributed in nature. "Repeater," as used in the following, can include a device, function or process which may, in some circumstances, provide full-duplex communication (e.g. bypassing the repeater core) or may otherwise differ from prior usages of "repeater." In one aspect the repeater function is performed by the combined operation of two or more, repeater modules which are spaced from one another and coupled together e.g. via cables. In one embodiment, different modules of the repeater may be housed in different network switches. For example, a computer network may include a plurality of switch boxes or chassis, typically all mounted in one or more racks, often adjacent one another with the switches being coupled to network nodes such as personal computers, work stations and the like. In one embodiment, two or more, in some cases, all, of the switches include one or more regions for receiving repeater modules, with the repeater modules in different switches being coupled to one another by cables and the like. Preferably, at least some aspects of system configuration are performed automatically.

According to one aspect, each of a plurality of repeater modules provides a light pipe for conveying module indicator light information to a position readily visible in the normal module operating location, such as visible when viewing a switch front panel. Preferably the light pipe is integrally formed with (formed as part of) a module case or shell.

According to one feature, a member is coupled to a repeater module printed circuit board (PCB) in such a fashion as to receive and/or convey heat generated by PCB components and/or certain electromagnetic radiation (and preferably, both heat and electromagnetic radiation). The member preferably forms all or part of a substantially electrically conductive and thermally conductive shell or shield around all or a portion of a forward (proximal) region of a repeater module. In one embodiment, a system of vents in a repeater module case provides air flow for dissipating heat.

According to one aspect, the repeater is configured to avoid reductions in the size of the IPG between pairs of packets by identifying certain invalid or "collision" symbols and forwarding the packet without causing downstream modules to increase packet length at the expense of the IPG.

A repeater, useable for connecting switches in a data communication network, is provided in a distributed and/or modular fashion. The repeater includes a plurality of separate and distinct components or modules connected to or at least partially housed in, the various switches which the repeater modules couple. The distributed and/or modular repeater facilitates accommodating various switching or repeater needs as a network grows or contracts. A light pipe, preferably integral with a module case, conveys indicator lights to a position visible when viewing a switch front panel. A heat spreader unit receives and/or conveys heat and/or protects against undue EMI. A collision-handling state machine transmits modified collision fragments so as to avoid reduction in interpacket gaps, e.g. by downstream repeater modules.

BRIEF DESCRIPTION OF THE DRAWINGS

FIG. 1 is a block diagram depicting a plurality of personal computers coupled to a switch according to previous approaches;

FIG. 2 is a block diagram depicting a plurality of switches coupled to a repeater according to previous approaches;

DETAILED DESCRIPTION

Figure 3A:
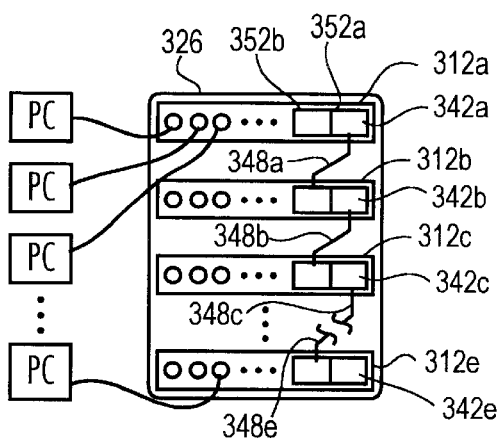
FIGS. 3A–C are block diagrams depicting components of networks with a plurality of switches, each including a repeater module, with repeater modules coupled according to embodiments of the present invention.

As depicted in FIG. 1, a common configuration of previous networks included a switch 112 having a plurality of ports 114a, b, m, p coupled to a variety of network nodes, illustrated, in FIG. 1, by personal computers (PCs) 116a,b,m. Nodes can include a variety of items including printers, scanners and the like. Depending, at least in part, on the type of network implemented, the connections can be way of cables 118a,b,m, such as coaxial cables, twisted pairs, optical fiber, or one or more wireless links and the like. Often, networks are configured to effectively place limits on the length of the node-connecting cables 118a,b,m and accordingly, in many configurations, the switch 112 must be positioned within a predetermined distance from the nodes 116a,b,m. When it is desired to also include nodes positioned beyond such distance, commonly one or more additional switches 122 are placed in a remote location, often coupled by a link such as an optical fiber link 124. In the configuration depicted in FIG. 1, switch 112 has a relatively large number of ports 114a through 114p. In some configurations, as depicted in FIG. 2, switch functionality is provided by using a plurality of smaller switch components 212a,b,c,e each with its own set of node-connecting ports 214a, b, c, m coupled e.g. by coaxial or other cable 218a, b,c,m to PCs or other nodes 216a,b,c,m. Although the present invention can be used in connection with a plurality of different configurations of switches or other network components, in at least some systems, each of the switches 212*a,b,c,e* may have, for example, 12 or 24 10/100 ports 214*a, b, c, m*. Commonly, the switches 212*a,b,c,e* are substantially identical to one another and housed in separate boxes or chassis, such as 1RU form factor chassis, often mounted in a rack or cabinet 226. Even though, in the configuration depicted in FIG. 2, the switch functionality is provided by a plurality of individual switches 212*a,b,c,e*, it generally facilitates configuration and system administration if the plurality of switches 212*a,b,c,e* can operate substantially as if it were a single switch (similar to switch 112 shown in FIG. 1). Toward this end, in the configuration of FIG. 2, each of the switches 212*a,b,c,e* is coupled, e.g., via cable 228*a,b,c,e* to ports 232*a,b,c,e* of a repeater 234. In general, the repeater receives, from each switch 212*a,b,c,e*, the information or signals (e.g. the signals received at the node ports 214 of each respective switch) and transmits, preferably broadcasts, these signals or information to all of the other coupled switches. Typical repeaters were configured to strive for accuracy in repeating the signals and, typically, changes or modifications to the signals were avoided.

In the configuration as shown in FIG. 2, the repeater 234 is a monolithic (undistributed) repeater, typically housed in a single chassis or box separate from, but relatively close to, the switch boxes 212*a,b,c,e*. The repeater 234 has a predetermined number of ports 232*a,b,c,e,m*. And in general, repeaters were typically available in a relatively small number of discrete sizes such that systems often were provided with somewhat over-sized repeaters, both in terms of the number of ports 232 and the physical size of the repeater box or chassis 234, which was typically related to the number of ports 232. Thus, as shown in FIG. 2, often there were multiple unused ports (e.g. 232*m*) in a repeater 234 for a given system, e.g., in order to provide for possible future expansion or as a result of downsizing from a larger previous network. Commonly, there are costs associated with the space required to accommodate network components such as switches and/or repeaters and, accordingly, many previous systems, due to the undistributed and nonmodular nature of typical repeaters, essentially required networks to be configured to occupy more physical space than was minimally necessary for the currently-needed network functions. Thus, in many previous systems, the repeater 234 occupied an unnecessarily large space within the rack or cabinet 226, wiring closet, or similar space.

Figure 8:
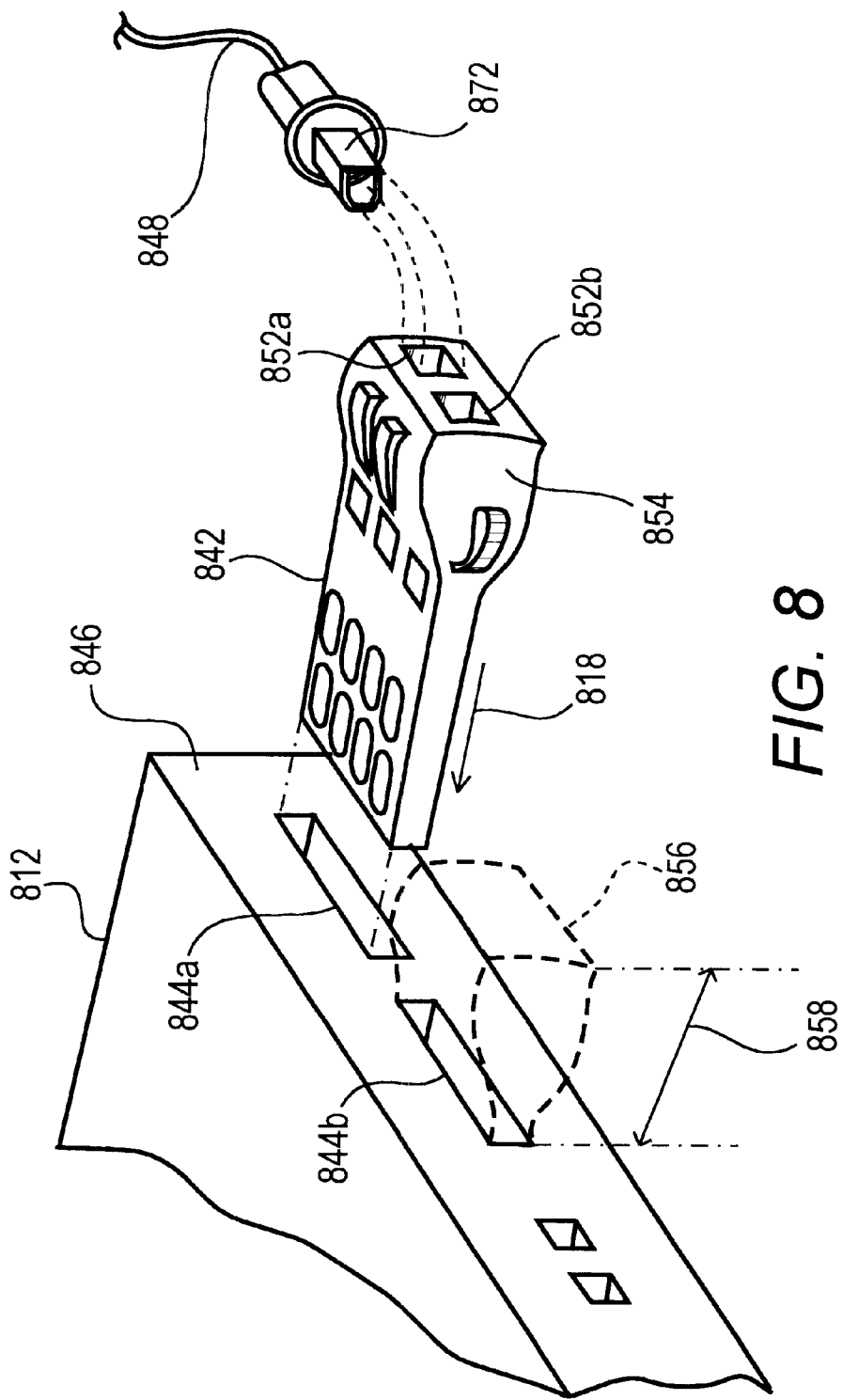
FIG. 8 is a perspective view, partially exploded, of a switch and repeater module according to an embodiment of the present invention.

According to one embodiment of the invention, generally as illustrated in FIGS. 3, 4 and 8, a repeater, preferably a high bandwidth (such as one gigabit per second or more) repeater is provided in a distributed and/or modular form. By "distributed" it is meant that the repeater is made up of, or includes, a plurality of separate, distinct and spaced-apart components. Preferably the distributed repeater components are accommodated in a plurality of a switch chassis or boxes 312*a,b,c,e*. By distributing the repeater components into the various switch chassis 312*a,b,c,e*, it is no longer necessary to provide a separate repeater chassis or box 234 of the type depicted in FIG. 2 and thus there is no need to provide separate space in a cabinet, rack 326 wiring closet or similar space to accommodate such a separate chassis or blocks. The components of the distributed repeater will occupy a certain amount of space or volume within the various switch chassis 312*a,b,c,e*; however, in the distributed repeater of at least some embodiments of the present invention, the cumulative amount of space which the repeater components occupy within the switch boxes is less than the volume of previous separate repeater boxes or chassis 234 (e.g. because of the ability to eliminate certain inefficiencies of space usage in both switch boxes and repeater boxes and at least partially as a result of the modular nature of the distributed repeater, in at least some embodiments).

By "modular," is meant that the distributed repeater includes a plurality of preferably similar or substantially identical repeater modules which can be added or removed to increment, or decrement, preferably with relatively small granularity, the repeater functionality, so as to substantially match the amount of repeater functionality that is provided, to the amount of repeater functionality that is needed (e.g. to avoid a situation such as that depicted in FIG. 2 in which the repeater 234 has substantially more port capability 234*m* than needed to provide repeater functions for the depicted switches.) In one embodiment, repeater modules are sized (both physically and in terms of function) to provide repeater functions with respect to a particular switch 312*a, b,c,e* in which the repeater module may be positioned. Preferably, the switches 312*a,b,c,e* may be populated with repeater modules 342*a,b,c,e* such that the total repeater functionality cumulatively provided by the repeater modules 342*a,b,c,e* is matched by the repeater needs presented by switches 312*a,b,c,e*. Thus, if it were desired to increase the size of the network, e.g. by adding an additional switch, such additional switch could be populated with appropriate repeater modules so that the entire system would still retain the proper amount of total repeater functionality for the total number of switches. Similarly, when it is desired to downsize the network, removal of a switch chassis or box, along with the repeater modules populating such switch, results in a downsized network switching capacity which is still properly matched to the cumulative repeater capability provided by the remaining repeater modules.

Figure 4A:
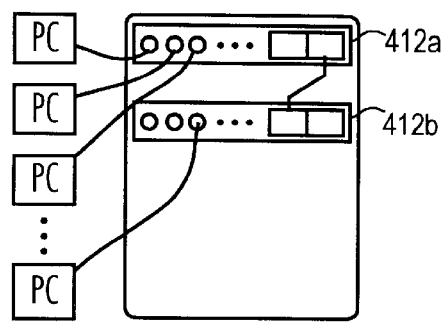
FIGS. 4A and B are block diagrams of systems as depicted in FIG. 3 but configured to permit full duplex operation.
Figure 3B:
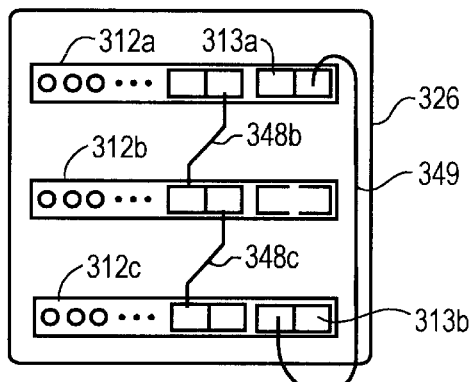
Figure 4B:
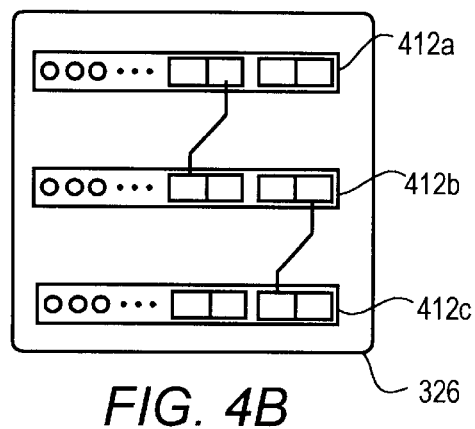
Figure 3C:
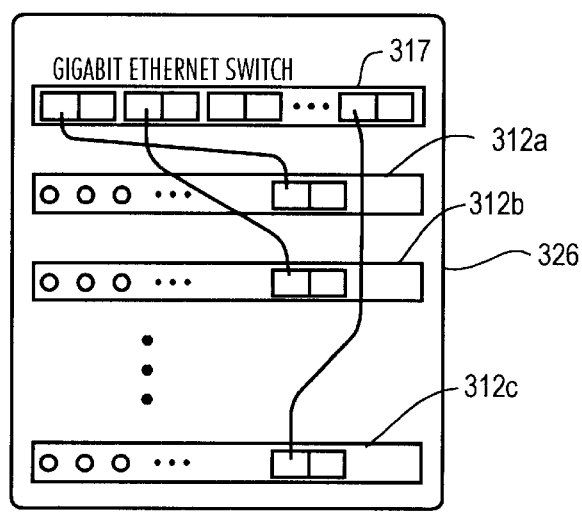

In one embodiment, the system permits a variety of different stacking or other architectures, depending on how the modules and cables are connected. For example, in one configuration, the system can be configured to provide a 1 Gigabit per second (Gbps) independent stack bus (through standard Gigabit Ethernet connections), e.g. as depicted in FIG. 3A, allowing a number of (in one embodiment, up to at least nine) switches to be stacked and managed through a single IP address. In another embodiment, the system provides support for a redundant loopback connection 349, e.g. using secondary repeater modules 313*a,b* in the top and bottom switches, as illustrated in FIG. 3B. In another configuration, a repeater module in each switch can be coupled to high bandwidth (e.g. gigabit) Ethernet switch 317 (FIG. 3C) forming a high-performance point-to-point configuration, to deliver e.g. 2 Gbps full duplex bandwidth between the high bandwidth Ethernet switch 317 and each switch 312*a, b, c* which is connected via the repeater modules. In one configuration, a number (e.g. up to eight, or more) switches can be aggregated in a Gigabit Ethernet star topology. In one embodiment, a pair of switches can be coupled to provide a full-duplex configuration, as illustrated in FIG. 4A (and as described more thoroughly below). In one embodiment, by employing a secondary repeater module 413 in at least one switch, 412*b*, two or more full-duplex connections can be provided, as illustrated in FIG. 4B.

In one embodiment, the system is configured to facilitate adding or removing repeater modules, as needed or desired, preferably by coupling or uncoupling cables and/or modules, preferably without the need for any additional setting of switches or other configuration or manipulations, and preferably involving access only to the switch boxes' front panels. In at least some embodiments of the present invention, adding or removing repeater modules is facilitated by automatic detection of configurations or components.

Although it would be possible to provide switch housings 312a,b,c,e in which repeater modules were built-in, i.e. were not normally end-user removable, in the embodiment of FIG. 8, repeater functionality may be provided with respect to a particular switch box or chassis 812 by inserting one or more high bandwidth repeater modules 842 into openings 844a, 844b provided in on the front panel 846 of the switch box 812 and providing appropriate cabling, such as inserting a first end of an appropriate cable 848 into an opening 852 in the repeater module 842. As depicted in FIG. 3A, a plurality of repeater modules may be coupled, one to another, such as by cables 348a,b,c,e so that the plurality of repeater modules 342a,b,c,e can, together, provide the desired repeater functionality. As shown in FIG. 3A, in one embodiment, the repeater modules 342a,b,c,e each have left and right cable couplings and are configured such that, during normal operation, a cable, e.g. 348a, will couple a right coupling 352a of a repeater module in one switch 312a to a left coupling 352b of a repeater module 342b in a second switch 312b. In the embodiment depicted in FIG. 8, the repeater module 842 is configured with a flared proximal end 1854 which, on the module 842 is fully inserted (to the position 856 depicted, in phantom, in FIG. 8) extends outwardly a distance 858 from the front panel 846 of the switch housing 812.

In general, it is desirable to be able to configure, preferably automatically, the modules so as to permit full duplex communication whenever feasible, such as when exactly two modules are coupled but to automatically cause all cable-coupled modules to switch to half-duplex mode when three or more repeater modules are coupled e.g. as illustrated in FIG. 3A.

In general, it is desirable to configure repeater modules to assist in preventing, reducing or controlling electromagnetic interference (EMI) radiation. In many circumstances, electromagnetic interference (EMI) can be prevented or reduced fully or partially by enclosing components in a substantially continuous conductive shell. For example, if the switch box 812 constitutes (or includes) a substantially continuous (non-perforated) conductive box or shell, EMI may be substantially reduced or eliminated. However, as seen in FIG. 8, when a repeater module is installed, the outwardly protruding (proximal) portion 858, and particularly the cable couplings 852a,b could represent a potential break in continuity of the switch shell (effectively, a "hole" or perforation to the shell) which can lead to EMI radiation.

Figure 5A:
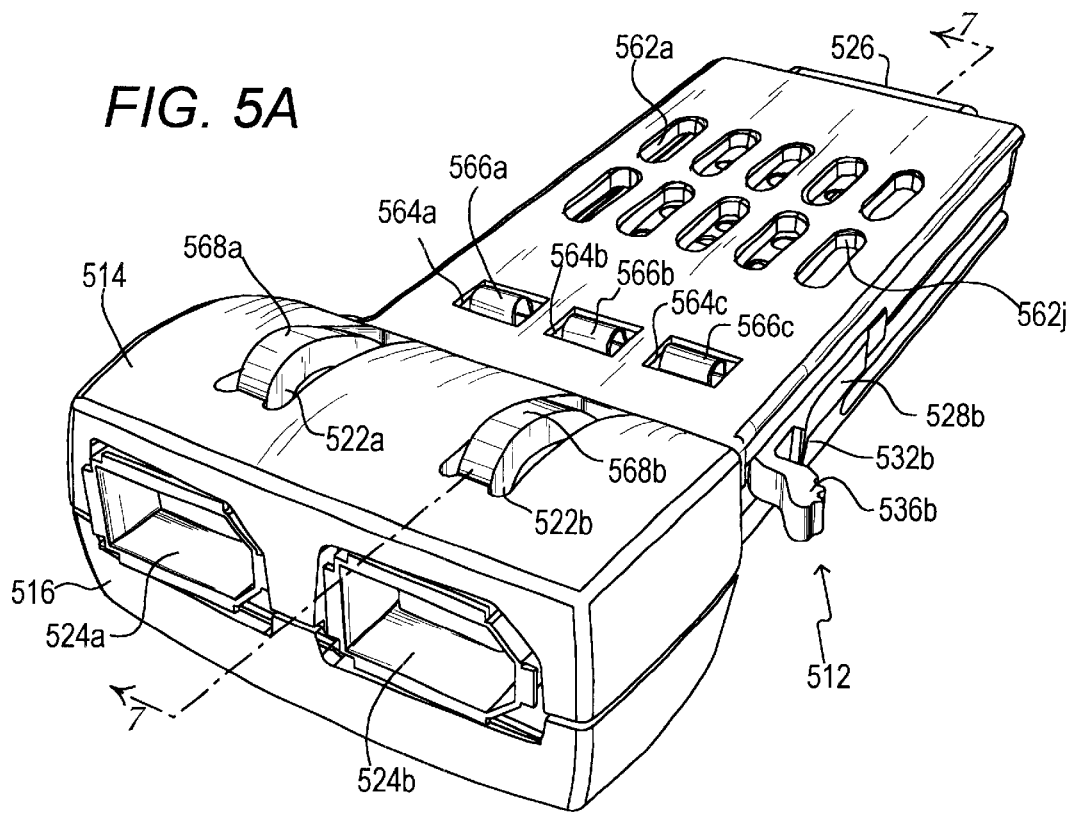
FIGS. 5A through 5G are perspective, front elevational, top plan, left side elevational, bottom plan, right side elevational and rear elevational views of a repeater module according to an embodiment of the present invention.
Figure 5B:
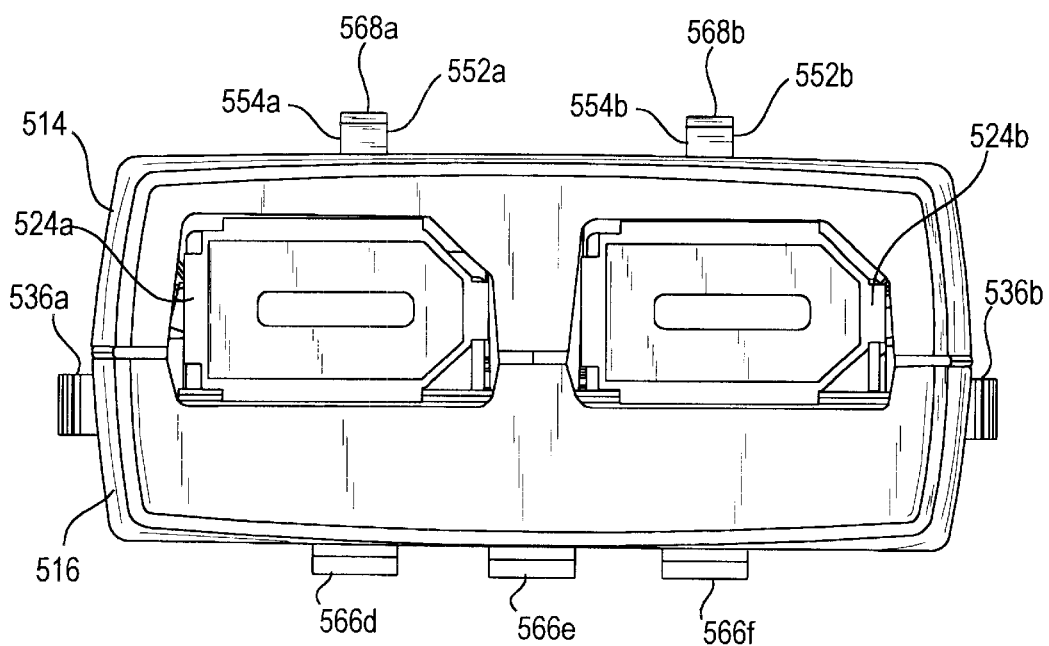
Figure 5C:
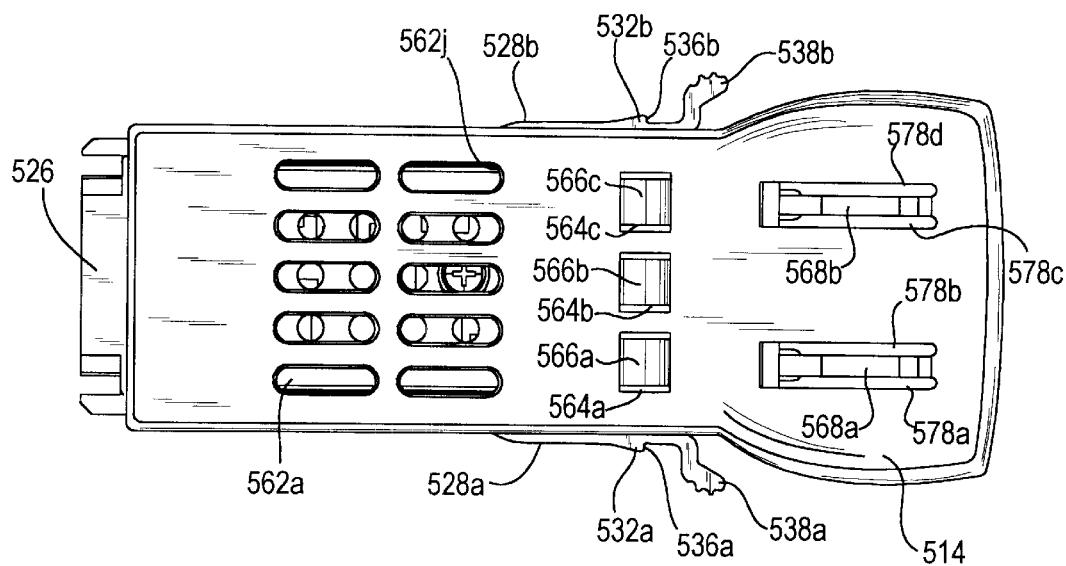
Figure 5E:
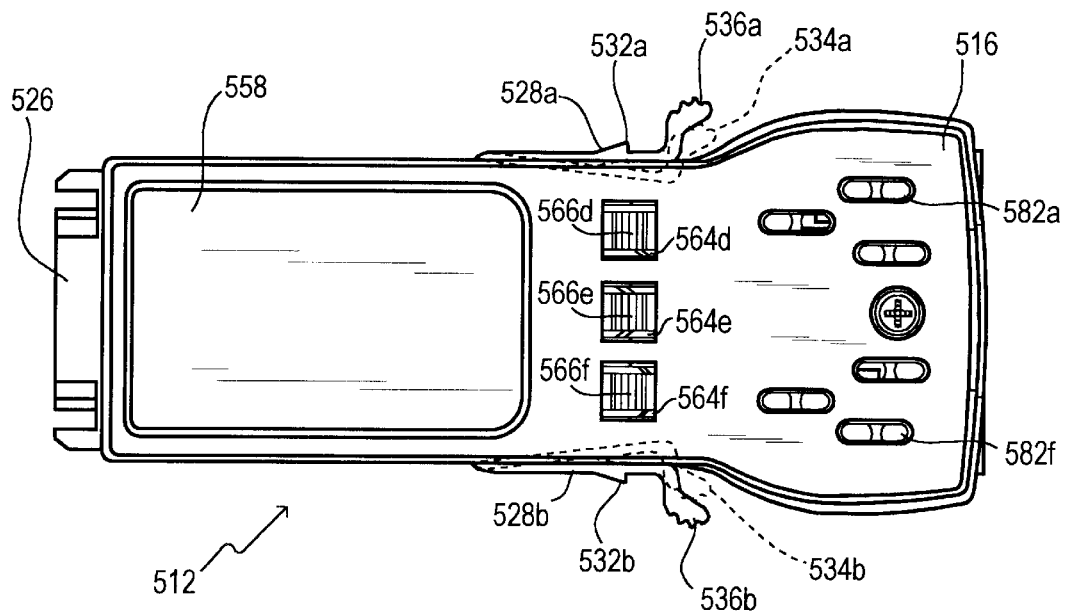
Figure 5D:
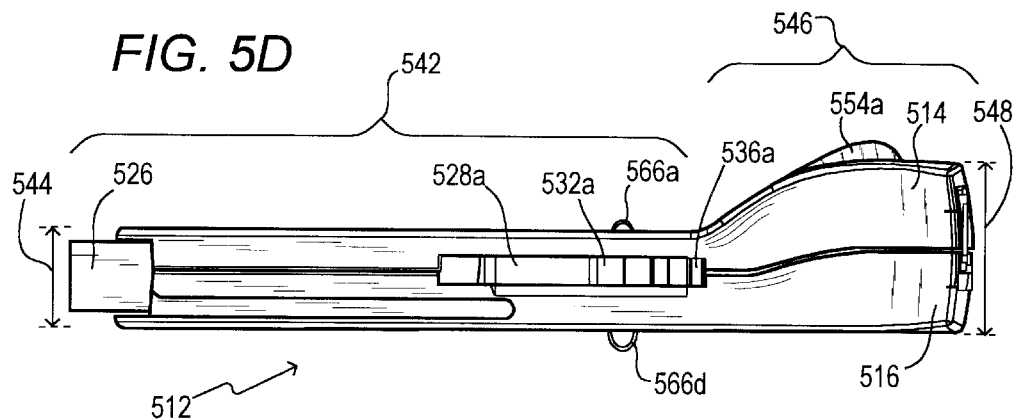
Figure 5F:
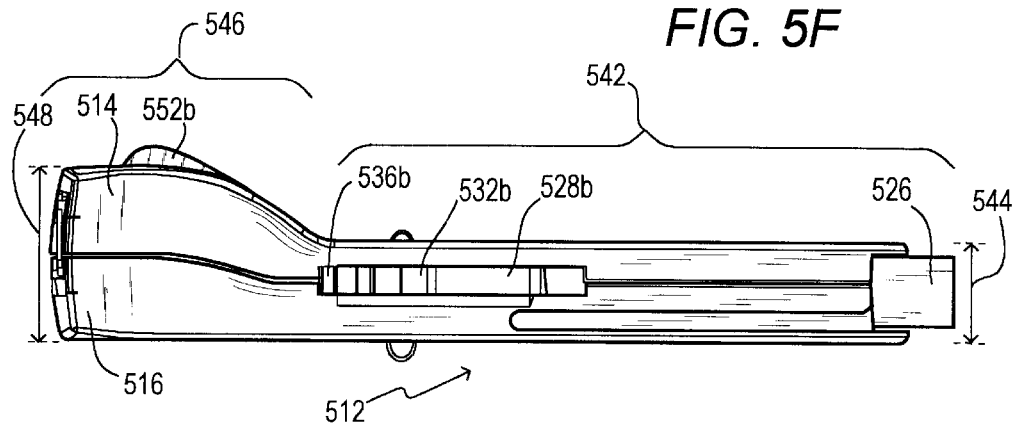
Figure 5G:
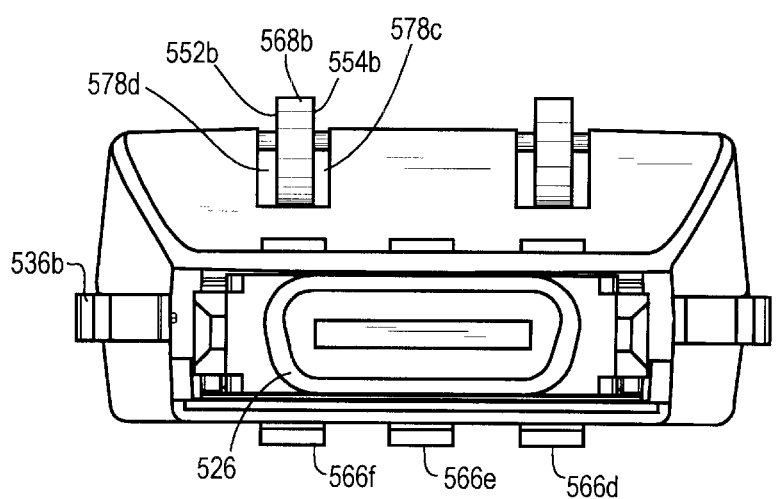
Figure 6:
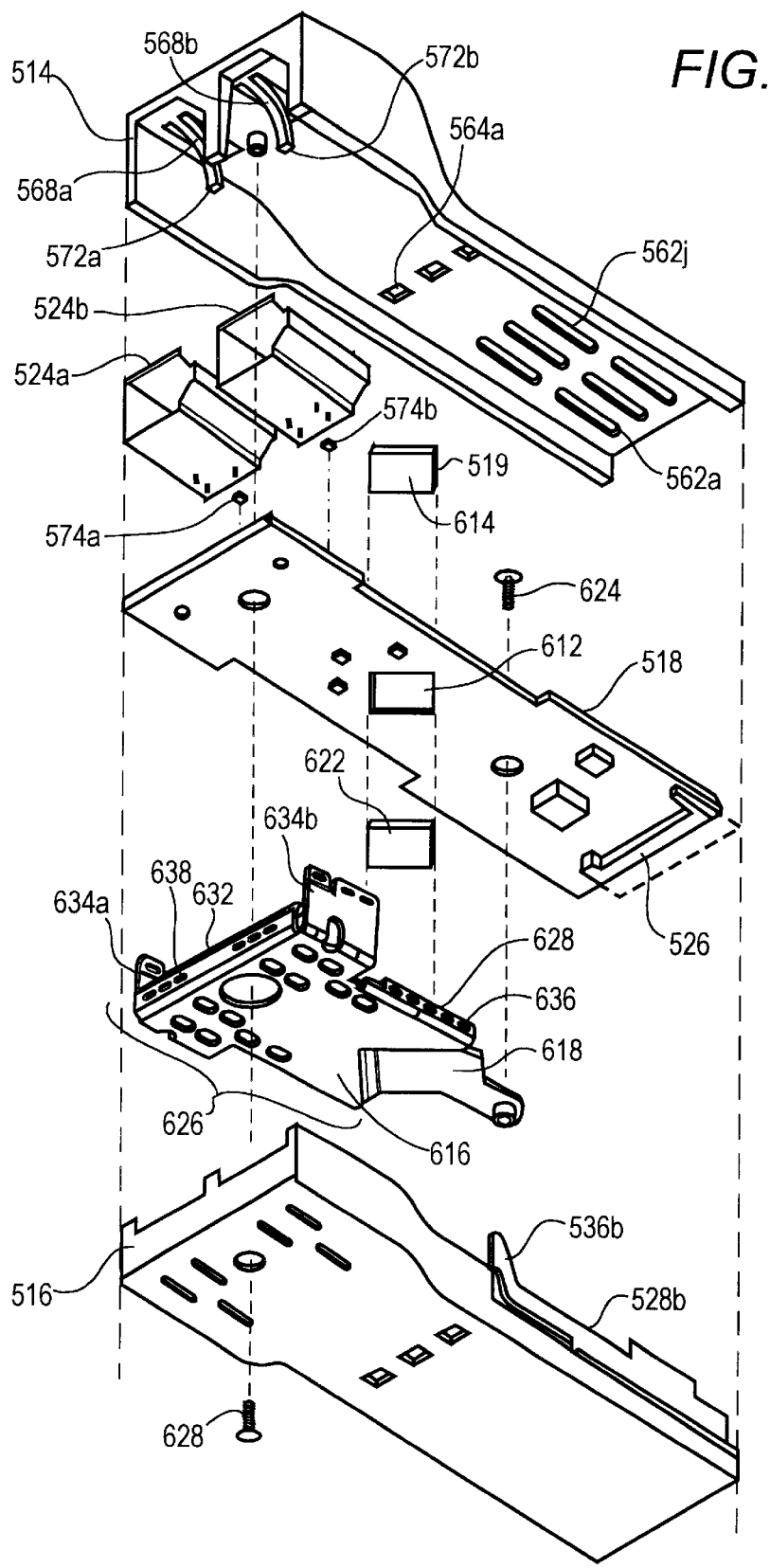
FIG. 6 is an exploded bottom perspective view of a module according to an embodiment of the present invention.
Figure 7:
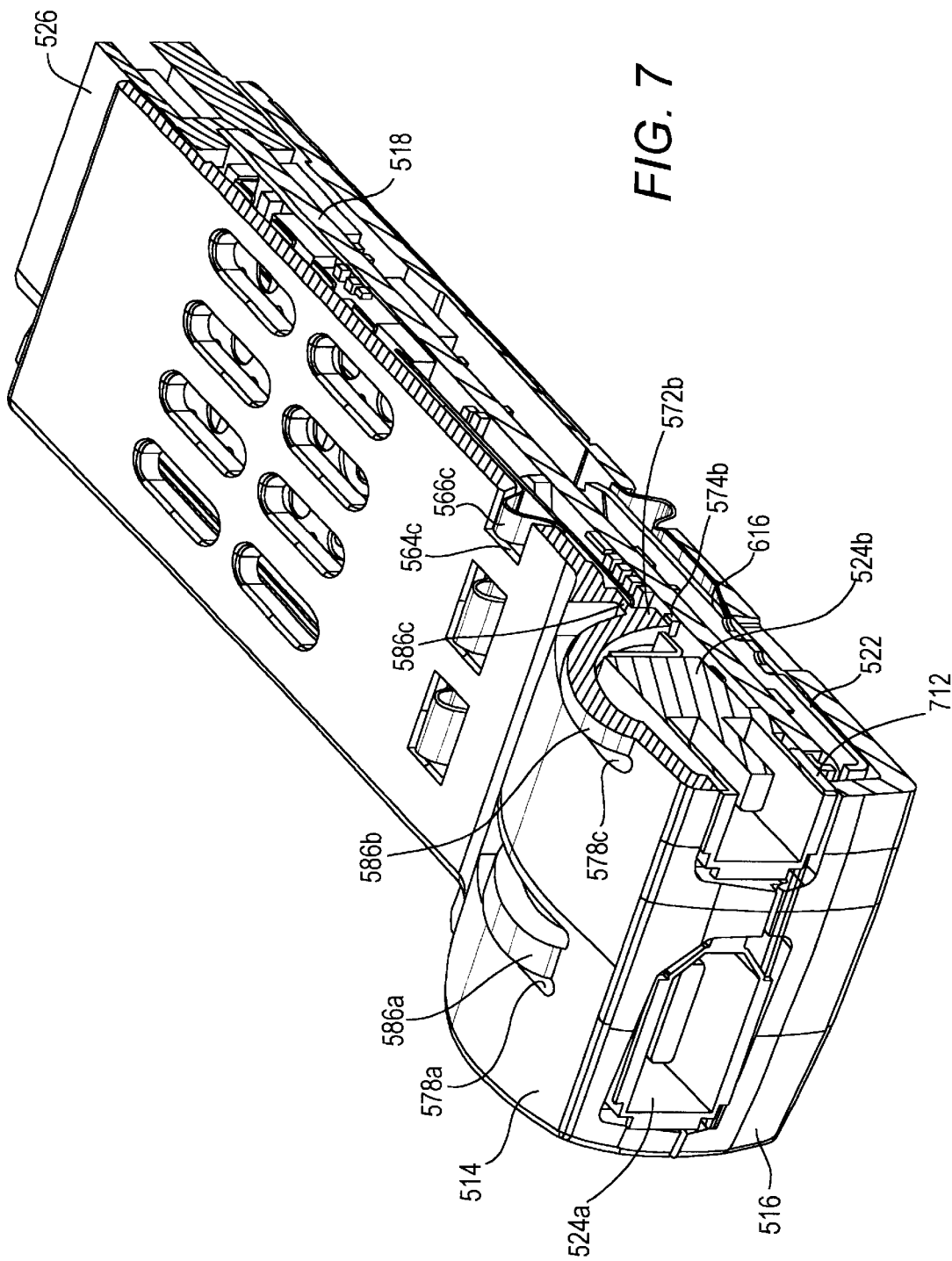
FIG. 7 is a perspective, partially cross-sectional view of the module of FIG. 5A taken along line 7—7 of FIG. 5A.
Figure 9:
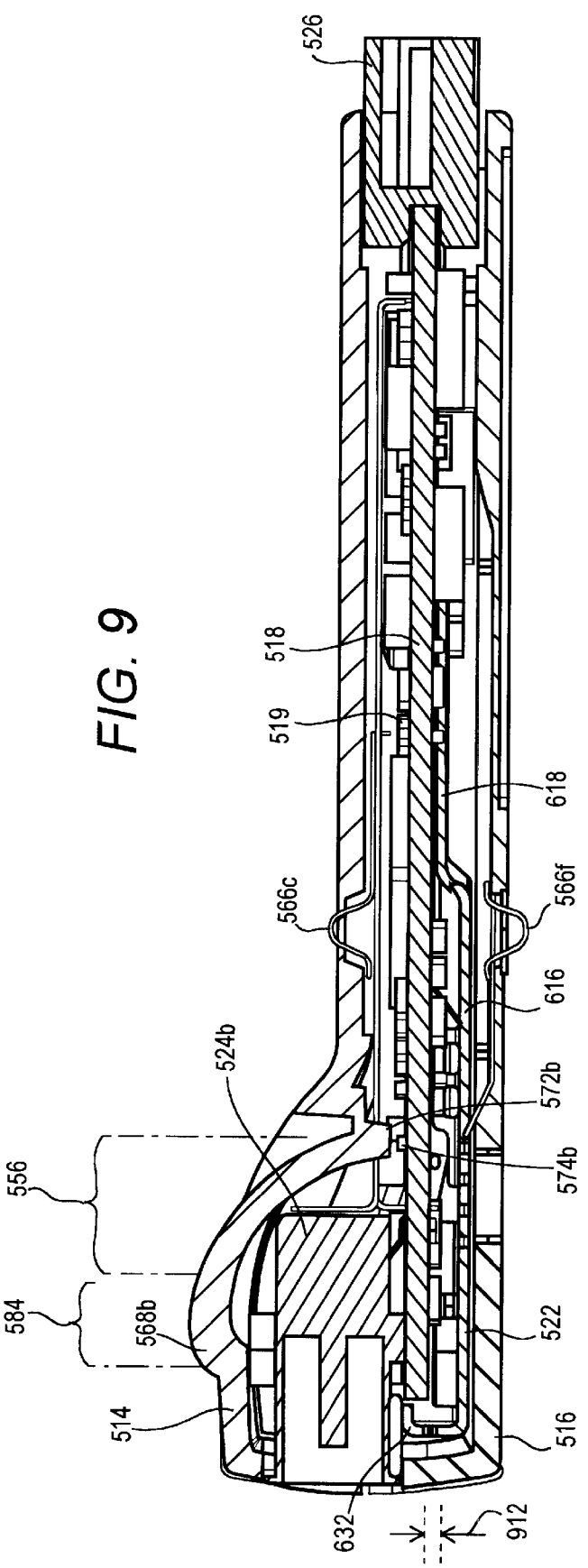
FIG. 9 is a longitudinal cross-section taken along line 7—7 of FIG. 5A.

In the embodiment depicted in FIGS. 5A through 5F, a repeater module 512 has an outer casing or shell formed of an upper shell member 514 and a mating lower shell member 516. As can be seen in FIGS. 6, 7, and 9, the upper and lower shell members 514, 516 enclose a number of components including, a heat dissipater/EMI component 522, proximal end cable couplers 524a,b, a distal end coupler 526 (for coupling, e.g. to a connector in a switch device) and a circuit board 518 (with a number of components mounted on the printed circuit board, including, in the illustrated embodiment, an ASIC 519). In profile, the modules 512, as best seen in FIGS. 5D, 5E and 5F, include a distal portion 542 having a first thickness 544 flaring to a proximal portion 546 having a second, greater thickness 548. The upper and lower shell portions 514, 516 can be formed of a number of materials including polycarbonate or thermoplastic materials and plastics, in general, such as by an injection molding process, and can be fabricated so as to have a number of different appearances. In one embodiment, substantially all visible exterior surfaces of the shell, except for the light pipe sidewalls 552a,d 554a,b and distal portions 556 of the upper surface of the light pipe, and a lower surface label area 558 (which are preferably kept polished or smooth) are provided with a stippled or etched-like texture (imparting a frosted appearance). In one embodiment, the upper and lower shells 514, 516 are substantially transparent. In one embodiment, the upper shell 514 is substantially clear or colorless and the lower shell 516 has a blue-green color. The upper and lower shell members 514, 516 are preferably coupled together by interlocking or latching resilient tabs (not shown) and/or a coupling member such as a screw 628, although other coupling components and procedures can be used such as adhesive, ultrasonic welding and the like.

The left and right sidewalls define left and right latching arms 528a,d. When the module 512 is inserted into the switch (e.g. as depicted in FIG. 8) left and right switch opening edges contact a ramp or cam surface on each arm 532a,b deflecting the arms inwardly, e.g. to the positions 534a,b depicted, in phantom, in FIG. 5E. After the ramp 532a,b clears the edge of the switch opening, the edge of the switch opening engages the shoulders 536a,b of the (now relaxed) resilient arms 528a,b preventing removal of the module 512. When it is desired to remove the module 512, the user grasps the, preferably knurled, handles 538a,b of the arms 528a,b moving them inward, with a pinching motion, to the positions 534a,b depicted in FIG. 5E thus releasing the edges of the switch opening from engagement with the shoulders 536a,b and permitting the modules 512 to be withdrawn.

The distal upper surface of the upper shell 514 includes a plurality of perforations 562a through 562j there through, providing for communication with the interior of the shell to provide airflow, e.g. for heat dissipation plurality of openings 582a through 582f on the proximal region of the lower surface (FIG. 5E) also provides for air flow through the module 512, assisting in heat dissipation. A second plurality of openings 564a through 564c on the upper surface and a corresponding plurality of openings 564c through 564f on the lower surface can also provide an amount of air flow that additionally accommodate protrusion of (resilient conductive) members 566a through 566f there through for coupling to switch EMI shield members, preferably coupled to chassis ground.

Light pipes 568a, 568b are preferably integrally formed (i.e. formed as part of, such as in a single injection-molding or similar step) with the upper shell 514. Light pipes 568a,b are configured to define first and second light-entry surfaces 572a,b which are positioned adjacent light emitting diode (LED) devices 574a,b (mounted on the circuit board 518) or similar light sources. The juxtaposition of light-entry surfaces 572b of the light pipe with the LED 574b provides for conveyance of the LED light along the light pipe. The light emitting diodes are preferably controlled to provide indications of module functions, operations, status, or states, and the light pipes 568a,b act to convey the light from the light emitting diodes to a position such that the signals are readily visible when the modules 512 are in the normal operating positions, such as depicted in FIG. 8, i.e. are readily visible when viewing the front panel of the switch of FIG. 8. The LEDs can be controlled to provide a number of different signals or indications, such as providing constant-on, constant-off flashing or other patterns, various colors and the like. The light signals can be used to indicate, among other items, the presence or absence of a proper connection such as a cable connection from one module to another module, detection of an improper or unauthorized cable, various modes of operation such as full duplex versus half duplex operation and the like.

Figure 11A:
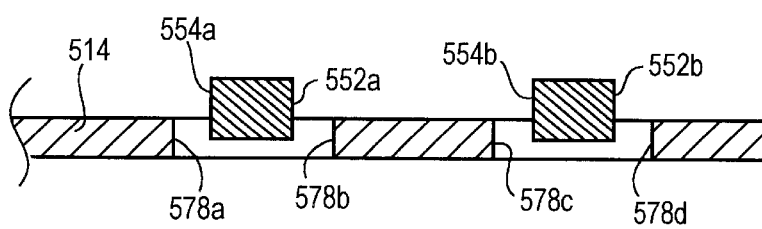
FIGS. 11A and 11B are lateral cross-sectional views taken through light pipes according to embodiments of the present invention.
Figure 11B:
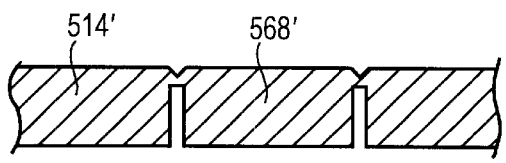

Light pipes can be configured in a number of different fashions and using a number of different materials, as will be understood by those of skill in the art of optics. In the depicted embodiment, the light pipes 568a,b have a substantially rectangular cross-section and a substantially arcuate or curved profile (e.g. as depicted in FIG. 9). In the depicted embodiment, the sidewall surfaces 552a,b, 554a,b of the light pipes 568a,b are spaced from adjacent portions of the upper shell 514 to define gaps 578a,b,c,d on either side of the light pipes. The light pipes are structurally supported, and the depicted embodiment only at the front edges 586a,b and rear edges 586c. It is also possible to construct light pipes in which some or all portions of the light pipes have some lateral connection to the remainder of the shell, e.g. as depicted in FIG. 11B. The gaps 578a,b,c,d not only define the sidewall surfaces for the light pipes, but also provide additional regions for air circulation to assist in heat dissipation. The sides 552a,b, 554a,b and light entry surface 572a,b of the light pipes are sufficiently smooth to allow light entry and reflection within the light pipe for light transmission. Preferably, proximal portions of the upper surface 584 the light pipes are stippled or textured to promote light transmission (for visibility) from these surfaces.

By providing two or more indicator lights, preferably at least one light relevant to each port, and preferably situated physically adjacent (as depicted, above) each port, inspection of a rack of switches, with repeater modules as described herein, can be readily scanned for viewing operation of components in a straightforward and intuitive manner. By molding the light pipe as part of a structural case, the use of additional space for accommodating a separate and distinct light pipe is avoided, consistent with a preference for providing physically small and compact modules. Furthermore, by using the structural case to double as the light transmission medium for port indication, a relatively economical configuration is achieved.

In the embodiment depicted in FIG. 6, a solder-tinned region 612 is formed on the lower surface of the PCB 518 opposite the location (on the PCB upper surface), where the ASIC 518 is mounted. The region 612 is heavily populated with vias through the thickness of the PCB 518, providing thermal conductivity for the substantial heat generated by the ASIC 519 through the PCB to the tinned region 612. The metallic underside of the ASIC is preferably directly soldered to the PCB, yielding good thermal contact. Heat transported to the tinned region 612 is, in turn, conducted to a substantially thermally conductive heat-spreader member 616. The heat-spreader member 616 is preferably formed of a tin-plated copper material for good thermal conductivity.

The heat spreader 616 includes a first contact surface 618 sized and shaped to contact the tinned region 612 to receive heat therefrom and conduct the heat throughout the spreader body 616 and thus provide the heat over a larger mass and surface area for more efficient dissipation, e.g. via airflow through thermal vents, e.g. 562, 582, 578. In one embodiment, the heat spreader 616 is thermally connected the PCB through a 0.005 inch thick Kapton wafer, 622 coated with thermally conductive grease. The Kapton wafer 622 improves thermal conductivity by helping eliminate air voids between the contract region 618 of the spreader 616 and the PCB 518 and reducing part tolerance effects.

Figure 14:
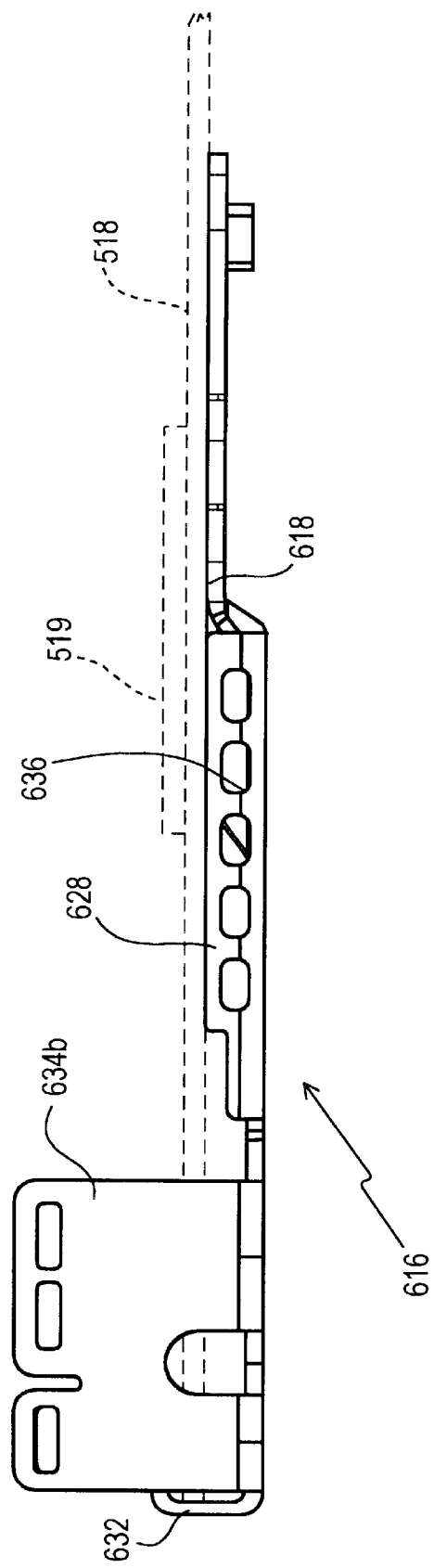
FIG. 14 is a side elevational view of a heat shield according to an embodiment of the present invention.

A screw 624 provides not only grounding property between circuitry (preferably connected to chassis ground, e.g. via a lead to the connector 526) on the upper surface of the PCB 518 and the thermally and electromagnetically conductive spreader 616 but also provides positive pressure between the heat spreader 616 and the PCB. More proximal regions 626 of the spreader 616 are stepped downwardly a distance 912, e.g. to provide clearance for components mounted on the proximal lower surface of the circuit board 518. The heat spreader 616 is preferably electrically conductive and preferably coupled to chassis ground and used to form all or part of an EMI shell or shield. In this regard, the heat spreader 616 is preferably provided with sidewalls 628, 632, 634a,b configured for coupling to edges of the PCB 518 and/or cable connectors 524a,b. In one embodiment, sidewalls 628, 632 are coupled to the edge of the PCB 512 by soldering. In the depicted embodiment, a plurality of perforations 634, 638 in the sidewalls 628, 632 (FIGS. 6 and 14) assist in the soldering operation by thermally isolating thin sections of the spreader part 616 so that the isolated sections heat up more quickly and uniformly (as compared to a solid part). The heat spreader 616 preferably contacts the underside of the cable connectors 524a,b through a conductive elastomeric EMI gasket 712. Preferably, by the described soldering of the heat spreader and use of the EMI gasket 712, a near-continuous shield is created around the front or proximal portion of the module 512 substantially reducing or eliminating EMI. The distal portions 542 of the module 512 are positioned within the chassis of the switch (e.g. as depicted in FIG. 8) and, in one embodiment, EMI protection devices of the switch are effective with respect to the distal portions of the module 512.

Figure 12:
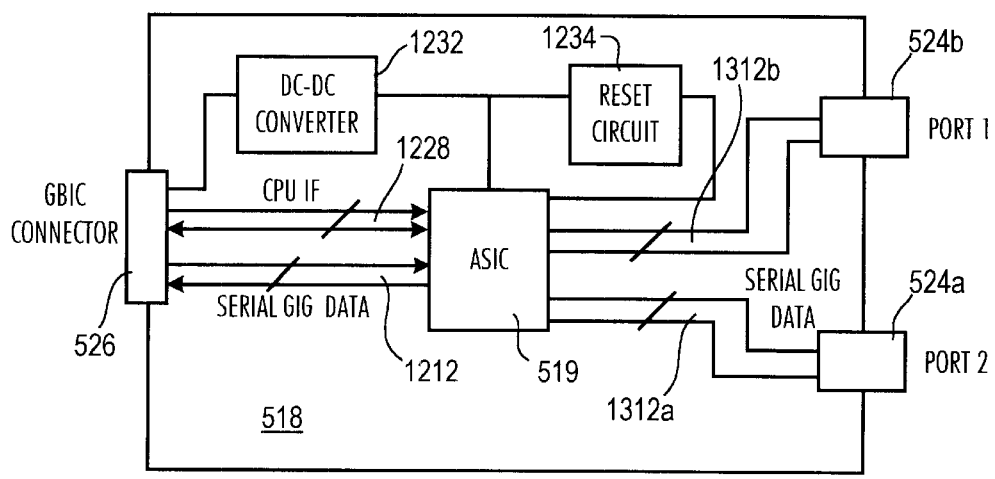
FIG. 12 is a block diagram of a circuit board useable in connection with an embodiment of the present invention.

As depicted in FIG. 12, the circuit board 518 provides connections such as serial gigabit data connections from the ASIC 518 to the first and second cable connectors 524a,b and provide serial gigabit data communication 1212 to the distal connector 526. The distal connector 526 also provides central processing unit interface (CPU IF) signals for communicating 520 to the ASIC 519 and power signals provided, via an AC-DC converter 1232 to both the ASIC 519 and to a reset circuit 1234.

Figure 13:
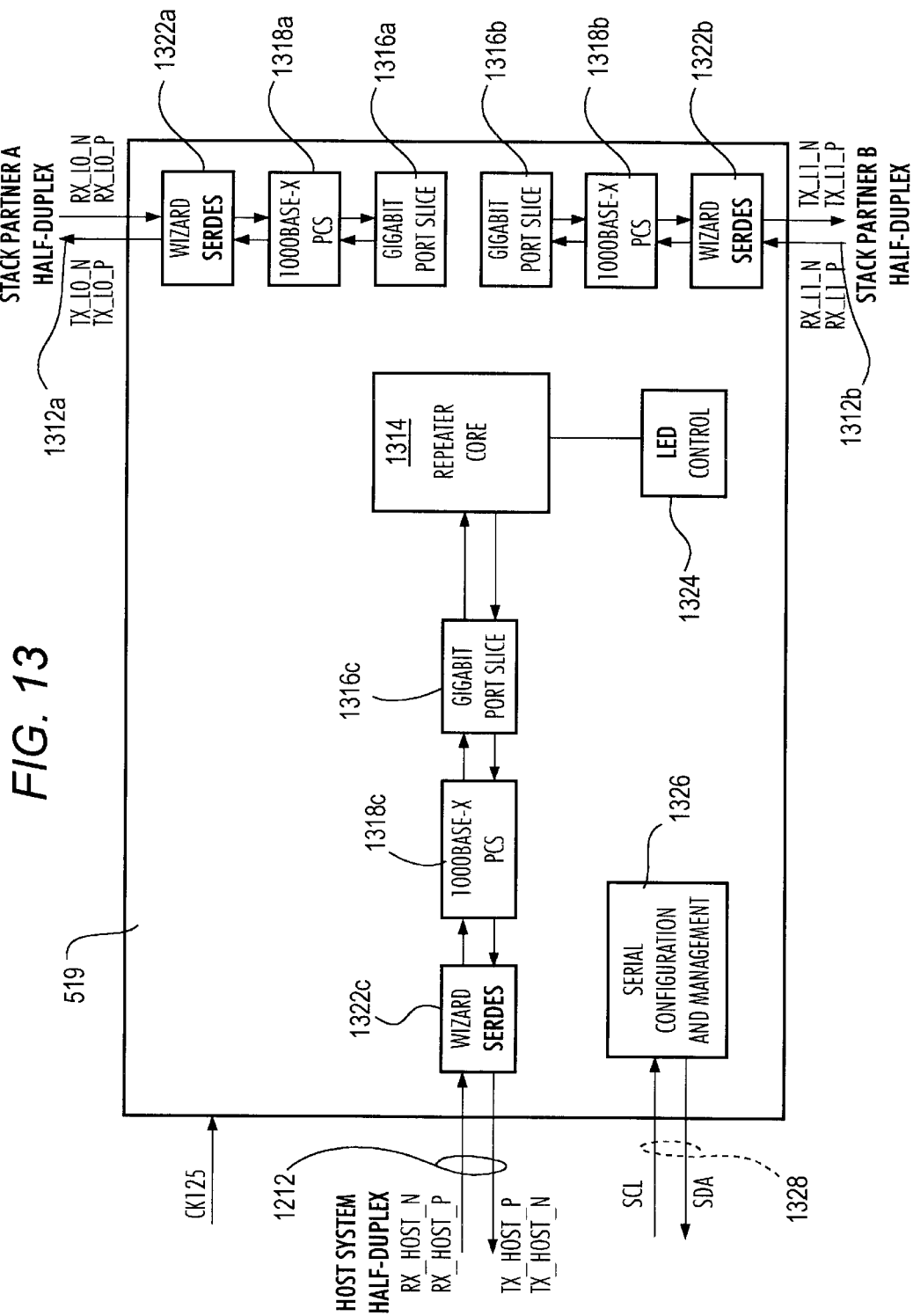
FIG. 13 is a block diagram of an application specific integrated circuit (ASIC) useful in connection with an embodiment of the present invention.

As depicted in FIG. 13, the ASIC 519 provides communication through 3 ports: first and second (half duplex, in FIG. 13) communication line 1312a,b (for coupling to the cable connectors 524a,b) and a port for communicating 1212 to the host switch (via the distal connector 526). In the ASIC 519 a repeater core 1314, with respect to each of the first two ports 1312a,b and the distal port provides communication via a gigabit port slice 1316a,b,c, a the physical coding sublayer (PCS) and a serializer/deserializer 1322a, b,c. An LED control 1324 controls the LED's 374a,b, e.g. as described above. Serial configuration and management circuitry 326 communicates with the host via configuration pins 1328.

Figure 10:
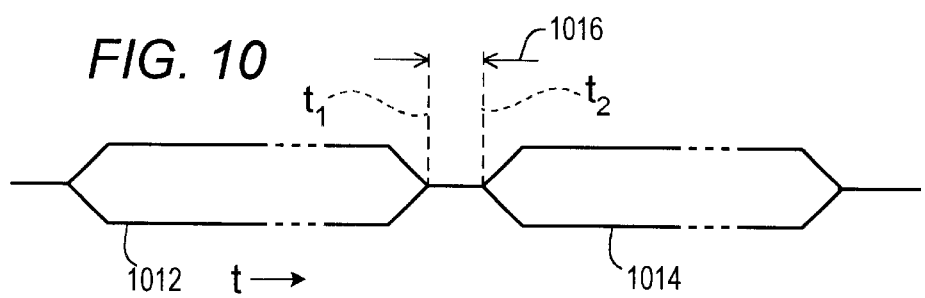
FIG. 10 is a timing diagram illustrating an interpacket gap.

Some or all of the features of the present invention can be used at least in connection with systems that provide packetized data communication, i.e. data in a plurality of data groups (which may also include header information, fillers and the like) of finite and/or determinant length. Typically, there is a period of time that transpires between transmission of any two successive data packets. This period is referred to as an interpacket gap (IPG). For example, as depicted in FIG. 10, a first data packet 1012 terminates at a first time $t_1$ and the transmission of the next packet 1014 does not begin until a later and different time $t_2$. The interpacket gap 1016 would thus have a duration equal to $t_2-t_1$. In at least some communication systems, it is important to assure that the IPG is always at least a certain minimum duration. In at least some embodiments of the present invention, there is a tendency for implementations of the distributed repeater to diminish the IPG.

It is generally desired to conform, as closely as feasible, with generally-accepted procedures and standards. In a typical deployed system, multiple repeater modules will be used in a local high-feedback bone. Preferably half-duplex IEEE 802.3Z will be used as the bus arbitration mechanism. However, it is believed that strict conformance to certain standards, in connection with the modular repeater of the present invention, can lead to problems. In particular, gigabit ethernet repeater standard defined by IEEE in clause 41 of 802.3Z/D5.0 ("GER") can create situations in which, in response to a collision packet, the packet is expanded in length, at the expense of the IPG. While this situation may be tolerated in a system having a single monolithic repeater device, when multiple modules, e.g. as described herein, each perform such packet expansion, at the expense of IPG, passage of such a packet, serially, through a plurality of modules can create excessive shortening of the IPG so as to shrink beyond the minimum required. Excessive IPG shrinkage can cause the following packet to be lost.

According to GER, a collision fragment will have a form similar to "VVVVVKDKDKD" (where each letter or group represents a bit-group or other signal defined by communications standards, well-known to those of skill in the art). According to GER, receipt 1612 (FIG. 16) of such a fragment will result in entering the "early end" state 1614 (defined in GER). The "early end" state results in transmitting an expanded packet while shortening the IPG. In particular, the collision fragment, on retransmittal, will be two symbols longer than received. The expanded packet, which may then be retransmitted to the next module, will also contain "VVVVKDKDKD" and thus each repeater module which receives such packet will further expand the packet and further shrink the IPG.

Figure 15:
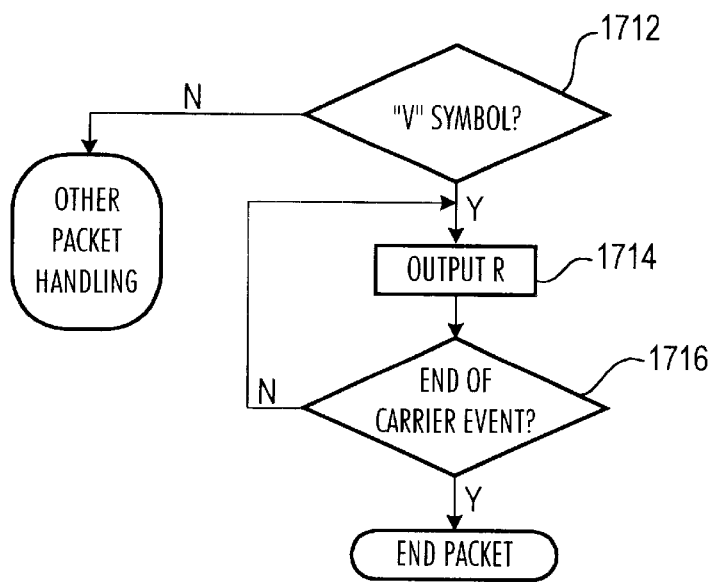
FIG. 15 is a flow chart of a procedure resulting in output of a modified collision fragment, according to an embodiment of the present invention.
Figure 16:
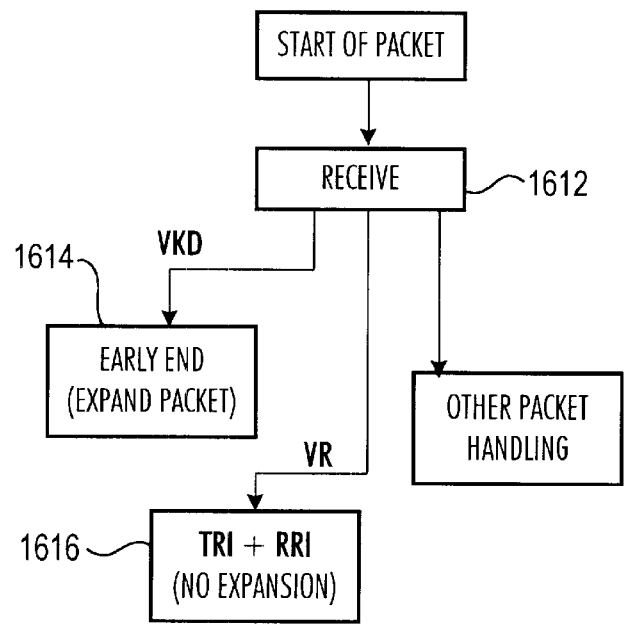
FIG. 16 is a flow chart of a portion of a collision handing procedure.

In order to avoid this problem, according to an embodiment of the present invention, in response to a collision fragment such as that denoted above, an altered fragment is transmitted, e.g. in which "R" symbols have been substituted for some "V" symbols. According to an embodiment of the invention, in response to receiving the first "V" symbol 1712 (FIG. 15), the collision arbitration state machine enters a new "propagate error" state. While in the "propagate error" state, the state machine will output "R" symbols 1714. The state machine will stay in the "propagate error" state until the end of the carrier event 1716. As a result, a collision fragment such as that denoted above would be retransmitted as "VRRRRRRDKDKDKD". Thus, after the first repeater module has received a collision fragment and has responded by retransmitting a collision fragment "VRRRRRRKDKDKDKD", the next repeater module, upon receiving the fragment "VRRRRRRKDKDKDKD", will note the presence of the "V" symbol and thus identify the packet as invalid (e.g. a collision fragment). However, rather than entering the "early end" state 1614, the state machine of the next repeater module will, instead, respond to the presence of the "VR" combination by entering the "TRI+RRI" state 1616 (FIG. 16). In response to entering the "TRI+RRI" state, the downstream repeater module will forward the collision fragment without increasing the packet length and without shrinking the IPG.

By using the above-described procedure for avoiding undue IPG shrinkage, a system is provided which is substantially compatible with all IEEE 802.3Z receivers but which nevertheless can provide multiple repeater modules in one network collision domain without causing excessive IPG shrinkage.

In light of the above description a number of advantages of the present invention can be seen. By providing a repeater which is distributed, a system can be configured such that multiple switches (e.g. mounted in a rack) can be treated by an administrator as if they were a single switch (e.g. allowing management of multiple switched ports from a single IP address), yet without requiring accommodating the substantial space occupied by a monolithic or non-distributed repeater (preferably providing interconnected switches with an independent high-speed stacking bus that preserves valuable desktop ports). The present invention can be used in a number of contexts including (without limitation) a stackable Gigabit Ethernet System. Preferably the repeater components are end-user installable and removable, i.e. do not need to be installed or removed by specially trained personnel (e.g. can be installed or removed by a system administrator), or using special tools. By providing a modular repeater, a system can be readily expanded or downsized including expansion or downsizing of repeater functionality, so as to reduce or substantially avoid excessive and unneeded repeater capability. Expansion can be provided with relatively small granularity, such as by purchasing and adding, at any one time, a small (e.g. 12 or 24 port) switch and one or two small (and relatively inexpensive) repeater modules sized to such switch. Preferably, the system can avoid undesirable levels of EMI (thus reducing EMI radiated from the distributed repeater. In at least one embodiment, the present invention assists the system in maintaining at least a minimum IPG, e.g. to provide sufficient time for processing overhead, accommodating packet variability and the like. By providing the ability for a system administrator of other end-user to readily form the components of the present invention into any of a plurality of configurations, preferably by using relatively inexpensive repeater modules, the present invention can provide relatively high flexibility and investment protection and manageability in a manner readily implemented by a system administrator. The present invention can provide highly flexible, preferably substantially scalable, stacking and/or connectivity options. It can provide high bandwidth (e.g. 1 Gbps) half-duplex connectivity in a daisy-chained configuration or full-duplex (e.g. up to 2 Gbps or more) connectivity in a dedicated, switch-to-switch configuration. The present invention can be used to implement systems which expand the traditional stacking domain beyond a single wiring closet, allowing users to select and combine a plurality of interconnections to accommodate a range of management, performance and cost needs.

A number of variations of modifications of the present invention can also be used. It is possible to use some features of the invention without using others. For example, it is possible to provide a repeater which is distributed but not necessarily modular and vice versa. It is possible to provide a distributed and/or modular repeater without providing some or all of other features described above such as. Although certain procedures or functions have been described as being executed using hardwired circuitry, it is possible, although not necessarily advisable to perform some or all such functions using a programmable device such as a microprocessor. In at least some embodiments of the present invention, there is no theoretical limit to the number of switch/repeater module units that may be cable-connected or otherwise "stacked," although there may be practical or feasibility limits such as software capability or complexity limitations, practical space considerations and the like. Although a cable (and cable connector) was described, it is possible to implement some or all features of the present invention using other communication links, such as other types of cables or connectors, optical cables, wireless links and the like. Although certain, preferably front-panel, connections were illustrated, repeater modules may be coupled to each other or to other circuitry, in other fashions, including internally in the switch box, by cables and/or by leads or circuitry, e.g. on one or more switch PCBs.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A network router device for coupling to a network switch comprising:
    at least first and second distinct router modules;
    at least said first router module having a casing and circuitry within said casing, with at least a first signal light positioned within said casing;
    at least said first router module configured to be coupled in a first position with respect to said switch;
    at least a first light pipe for conveying at least some light from said first signal light to a signal light output, wherein said signal light output is visible when said router module is in said first position.

2. A network router device as claimed in claim 1 wherein said switch has a front panel area and wherein said signal light output is visible when viewing said front panel area.

3. A network router device, as claimed in claim 1, wherein said light pipe is continuous with at least a portion of said casing.

4. A network router device, as claimed in claim 1, wherein said light pipe is integrally formed with at least a portion of said casing.

5. A network router device, as claimed in claim 1, wherein said casing is formed from at least a first injection-molded part and a second part and wherein said light pipe is formed with said first part in a single injection-molding operation.

6. A network router device, as claimed in claim 1, wherein at least one edge of said light pipe is spaced from adjacent portions of said casing to define an opening through said casing.

7. A network router device, as claimed in claim 1, wherein said light pipe includes a light entry region substantially adjacent said signal light.

8. A network router device, as claimed in claim 1, wherein said router device includes at least first and second ports, said signal light output being substantially adjacent said first port and further comprising a second light pipe defining a second signal light output substantially adjacent said second port.

9. A method for use with a network router device, said network router device for coupling to a network switch, the method comprising:
    coupling at least a first router component in a first predefined position with respect to said switch;
    controlling at least a first signal light, coupled to said first router component, to indicate at least first information relating to said router, wherein a signal light output is visible when said router component is in said first position.

10. A method, as claimed in claim 9 wherein said step of coupling a first router component comprises coupling one of a plurality of discrete modules of a modular router.

11. A method, as claimed in claim 10 wherein said first signal light is controlled to indicate whether said one module is coupled to at least a second of said plurality of modules.

12. A method, as claimed in claim 9 wherein said first signal light is controlled to indicate whether said router component is coupled to an approved cable.

13. A method, as claimed in claim 9 wherein said first signal light is controlled to indicate whether said router component is operating in full-duplex mode.

14. A method, as claimed in claim 9 wherein said first signal light is controlled to provide a signal including at least one of:
    A constant-on light signal;
    A constant-off light signal;
    A light flash pattern; and
    A light of any one of a plurality of colors.

15. A method as claimed in claim 9 further comprising conveying at least some light from said first signal light to said signal light output with a light pipe.

16. A method as claimed in claim 15 wherein said router component includes a casing and further comprising integrally forming said light pipe with at least a portion of said casing.

17. Apparatus for use with a network router device comprising:
    a first router component configured for coupling in a first predefined position with respect to a network switch;
    means for controlling at least a first signal light, coupled to said first router component, to indicate at least first information relating to said router,
    means for locating a signal light output such that light from said signal light is visible when said router component is in said first position.

18. Apparatus, as claimed in claim 17, wherein said first router component includes a casing and wherein said means for locating comprises at least first light pipe means.

19. A network router device for coupling to a network switch comprising:
    at least first and second distinct router modules;
    at least said first router module having a casing and circuitry within said casing;

a heat spreader having a first region, having a first surface area positioned for thermal conduction with respect to at least a portion of said circuitry and a second region, said heat spreader configured to provide heat conduction between said first region and said second region.

20. A network router device, as claimed in claim 19, wherein said second region defines a surface area greater than said first surface area.

21. A network router device, as claimed in claim 19, wherein said portion of said circuitry comprises at least a first integrated circuit.

22. A network router device, as claimed in claim 19, further comprising at least one circuit board, having first and second opposite surfaces and first and second opposite edges, and wherein said portion of said circuitry is mounted on a mounting portion of said first surface of said circuit board.

23. A network router device, as claimed in claim 22, wherein said first region is adjacent a thermal contact portion of said second surface of said circuit board.

24. A network router device, as claimed in claim 23, wherein said thermal contact portion of said second surface is at least partially aligned with said mounting portion of said first surface.

25. A network router device, as claimed in claim 23, comprising a plurality of vias through said circuit board at least in said thermal contact portion.

26. A network router device, as claimed in claim 22, wherein at least some of said second region of said heat spreader is spaced from said second surface of said circuit board.

27. A network router device, as claimed in claim 19, wherein said heat spreader is comprises a substantially thermally conductive material.

28. A network router device, as claimed in claim 19, wherein said heat spreader is comprises a material which is both thermally conductive and electrically conductive.

29. A network router device, as claimed in claim 19, wherein said heat spreader is comprises copper.

30. A network router device, as claimed in claim 22, wherein said heat shield is substantially electrically conductive and includes at least first and second edges adjacent at least portions of said first and second edges of said circuit board, to cover at least a portion of said circuit board wherein electromagnetic interference (EMI) from said portion of said circuit board is reduced, compared to a configuration in which said portion of said circuit board is uncovered.

31. A network router device, as claimed in claim 30 further comprising a plurality of openings through at least said first and second edges of said heat shield.

32. A network router device, as claimed in claim 30, further comprising an electrically conductive pathway from said heat spreader to a chassis ground of said network switch.

33. A network router device, as claimed in claim 19, further comprising a plurality of vent holes through said casing wherein air flow through said vent holes provides heat dissipation from said heat spreader.

34. A network router device, as claimed in claim 23 including at least one thermally conductive seal, selected from among a thermally conductive wafer and a thermally conductive grease, located between said thermal contact region of said circuit board and said first region of said heat spreader.

35. A method for dissipating heat in a network router device, said device for coupling to a network switch, the method comprising:
coupling at least first and second distinct router modules to said network switch, at least said first router module having a casing and circuitry within said casing;
coupling a heat spreader having a first region, having a first surface area positioned for thermal conduction with respect to at least a portion of said circuitry and a second region, said heat spreader configured to provide heat conduction between said first region and said second region.

36. A method, as claimed in claim 35, wherein at least said first router module includes at least one circuit board, having first and second opposite surfaces and first and second opposite edges, wherein said portion of said circuitry is mounted on a mounting portion of said first surface of said circuit board, and wherein said heat shield is substantially electrically conductive and includes at least first and second edges, and further comprising:
positioning said first and second edges of said heat shield adjacent at least portions of said first and second edges of said circuit board, to cover at least a portion of said circuit board wherein electromagnetic interference (EMI) from said portion of said circuit board is reduced, compared to a configuration in which said portion of said circuit board is uncovered.

37. Apparatus for dissipating heat in a network router device, said device for coupling to a network switch, the apparatus comprising:
at least first and second distinct router modules configured for coupling to said network switch, at least said first router module having a casing and circuitry within said casing;
means for spreading heat, said means for spreading heat having a first region, positioned for thermal conduction with respect to at least a portion of said circuitry and a second region, said heat spreader configured to provide heat conduction between said first region and said second region.

38. Apparatus, as claimed in claim 37 wherein at least said first router module includes at least one circuit board, having first and second opposite surfaces and first and second opposite edges, wherein said portion of said circuitry is mounted on a mounting portion of said first surface of said circuit board, and wherein said heat shield is substantially electrically conductive and includes at least first and second edges, and further comprising:
means for positioning said first and second edges of said heat shield adjacent at least portions of said first and second edges of said circuit board, to cover at least a portion of said circuit board wherein electromagnetic interference (EMI) from said portion of said circuit board is reduced, compared to a configuration in which said portion of said circuit board is uncovered.

39. Apparatus, in a computer network, for avoiding reduction of interpacket gaps below a minimum gap value, comprising:
at least first and second distinct router modules configured for coupling to a network switch;
a state machine, in at least said first router module, configured to
receive a sequential plurality of communication packets;
recognize at least a first collision fragment, having a first form, in at least one of said communications packets; and forward said at least one communications packet to said second router module, after altering said first collision fragment to a second form;

a state machine, in at least said second router module, configured to forward said at least one communications packet, received from said first router module with an altered collision fragment in said second form, in the absence of decreasing an interpacket gap.

40. Apparatus, as claimed in claim 39, wherein said state machine in said second module is substantially identical to said state machine in said first module.

41. Apparatus, as claimed in claim 39, wherein said state machine in said first module decreases an interpacket gap in response to receiving said one of said communications packets.

42. Apparatus, as claimed in claim 39 wherein said communications network communicates packets including V and R symbols in accordance with IEEE 802.3Z and wherein said first form includes a plurality of V symbols and wherein said second form has at least some of said V symbols replaced by R symbols.

43. A method, in a computer network, for avoiding reduction of interpacket gaps below a minimum gap value, comprising:

coupling at least first and second distinct router modules to a network switch;

receiving, in said first router module, a sequential plurality of communication packets;

recognizing, in said first router module, at least a first collision fragment, having a first form, in at least one of said communications packets;

forwarding, from said first router module to said second router module, said at least one communications packet, after altering said first collision fragment to a second form;

forwarding, from said second router module, said at least one communications packet, received from said first router module, in the absence of decreasing an interpacket gap below said minimum value.

44. Apparatus, in a computer network, for avoiding reduction of interpacket gaps below a minimum gap value, comprising:

at least first and second distinct router modules coupled to a network switch;

means, in said first router module, for:

receiving a sequential plurality of communication packets;

recognizing at least a first collision fragment, having a first form, in at least one of said communications packets; and forwarding said at least one communications packet to said second router module, after altering said first collision fragment to a second form;

means, in said second router module, for forwarding, from said second router module, said at least one communications packet, received from said first router module, in the absence of decreasing an interpacket gap below said minimum value.

* * * * *